US006014345A

United States Patent [19]

Schmadeka

[11] Patent Number: 6,014,345

[45] Date of Patent: Jan. 11, 2000

[54] APPARATUS AND SYSTEM FOR DAMPING EXTERNAL NOISES WITH MEANS FOR PRODUCING SOUND AND PREVENTING OVERSLEEPING

[76] Inventor: Kevin Lee Schmadeka, P.O. Box 714, Everett, Wash. 98206

[21] Appl. No.: 08/987,712

[22] Filed: Dec. 9, 1997

Related U.S. Application Data

[60] Provisional application No. 60/053,250.

[51] Int. Cl.[7] ........................... G04B 47/00; G04B 23/02; H04B 1/06

[52] U.S. Cl. .............................. 368/10; 368/73; 368/245; 455/231; 455/344

[58] Field of Search ................................ 368/10, 41–43, 368/47, 72–74, 245, 250, 251; 455/140, 141, 171, 181.1, 231, 344, 346–349

[56] References Cited

U.S. PATENT DOCUMENTS

| | | | |
|---|---|---|---|
| 3,908,180 | 9/1975 | Braginski . | |
| 4,047,377 | 9/1977 | Banks, Jr. . | |
| 4,082,918 | 4/1978 | Chang et al. . | |
| 4,166,358 | 9/1979 | Tremblay et al. . | |
| 4,481,674 | 11/1984 | Silva | 455/231 |
| 4,949,077 | 8/1990 | Mbuthia . | |
| 5,365,494 | 11/1994 | Lynch | 368/10 |
| 5,369,797 | 11/1994 | Tyree | 455/549 |
| 5,555,536 | 9/1996 | Rolf et al. | 369/19 |

*Primary Examiner*—Vit Miska

*Attorney, Agent, or Firm*—Seed and Berry LLP; Kevin S. Costanza

[57] ABSTRACT

An apparatus designed to damp external noises, allowing the user to sleep in noisy environments. More particularly, it relates to a pair of hearing-protecting ear covers that insulate the user's ears from external noises, ear covers that incorporate a headphone stereo for transmission of a time, smoke, fire and/or security alarms. The headphone stereo can also transmit music, peaceful sounds, or noise reducing frequencies. The sound producing circuitry is connect in parallel to the alarm system to allow alarm detection even when the user is listening to music or other sounds.

10 Claims, 2 Drawing Sheets

APPARATUS AND SYSTEM FOR DAMPING EXTERNAL NOISES WITH MEANS FOR PRODUCING SOUND AND PREVENTING OVERSLEEPING

CROSS-REFERENCES TO RELATED APPLICATIONS

Applicant requests priority based on the presently pending provisional patent application for the same invention, Ser. No. 60/053,250.

BACKGROUND OF THE INVENTION

This invention relates generally to an apparatus designed to damp external noises, allowing the user to sleep in noisy environments. More particularly, it relates to a pair of hearing-protecting ear covers that insulate the user's ears from external noises. This allows the user to sleep through any noise conditions. To accommodate for the loss of sound detection, the apparatus includes a headphone stereo for transmission of a time, smoke, fire and/or security alarms. The headphone stereo can also transmit music, peaceful sounds, or noise reducing frequencies. The sound producing circuitry is connect in parallel to the alarm system to allow alarm detection even when the user is listening to music or other sounds. In addition, an external speaker can produce both sound and alarms should the user take off the ear covers.

To accomplish all of these functions, the apparatus and system utilize a pair of hearing protector type earmuffs which are combined with stereo headphone speakers that are installed inside the earmuffs. The earmuffs are constructed to block external noise, while being comfortable enough to be worn during sleep. The stereo headphones are capable of transmitting sounds from pre-recorded tapes or compact discs in order to cover up any ambient noises not insulated by the ear muffs. The headphones may also, separately or simultaneously, generate a noise cancellation frequency. To compensate for the loss of sound detection, the apparatus and system also transmit signals from a time alarm which, in the preferred embodiment, is an integral part of the apparatus, or any other compatible alarm or signaling device external to the apparatus. The apparatus can also play music from a cassette player, compact disc player, radio, or other source. All the sound producing circuitry is connected in parallel to the alarm circuitry allowing the alarm signals to be heard even if the user is listening to music or other sounds.

External noise is a common problem for people who have difficulty sleeping. Falling asleep and staying asleep is difficult if not impossible when there is loud or intermittent noise in the area. In order to sleep under such conditions, many individuals sleep wearing earplugs or earmuffs. Doing so, however, can prevent that individual from hearing anything, including a time alarm, smoke alarm, or other audible security device.

Numerous devices have been introduced over the years attempting to overcome this problem. Most of these, however, incorporate only additional sounds or noises superimposed over the disturbing sound in an attempt to drown it out. One such invention is shown in U.S. Pat. No. 4,047,377 to Banks, Jr. In the Banks patent, the unit provides an even sonorous hum in the vicinity of the person employing the system. The hum drowns out external noise. When the time alarm triggers, a relay terminates the humming noise.

The primary shortcoming of this device is that it utilizes only white noise to drown out external noise. Many individuals are not aided in sleeping by white noise. In addition, white noise only drowns out a portion of the external noises. Intermittent noises that are significantly louder than the ambient noises will still be heard above the white noise. If the external noise is extremely loud, as in cases where the individual is sleeping on a ship or next to a construction site, the white noise must be played so loud that it becomes disturbing itself.

The only invention known to the present inventor that incorporates hearing-protecting ear covers combined with speakers is described in U.S. Pat. No. 4,082,918 to Chang et al. In the Chang patent, a dental patient wears a headset which blocks out sound and comprises headset speaker for playing music or white noise. The headset insulates the user from external noise and the speakers superimpose music over any external sounds. The speakers have a manual override with which the doctor or dentist may speak to the patient via a microphone.

The Chang invention is in a different class from the present invention in that the invention is not designed to be worn during sleep and thus does not incorporate an alarm element. An individual using the device during sleep would be in danger of sleeping through a time alarm or, even worse, a security or safety alarm. Without an individual present to manually override the music or white noise, the user would be unable to hear any alarm. Also, the invention does not contemplate sleeping and, therefore, does not contain any of the limitations necessary to make the headset comfortable for sleep.

The inventor knows of no device that not only insulates the user from all external sound, but also provides soothing sounds or music of the user's choice to aid in sleeping while at the same time assuring the user that an alarm will be heard; a device that is also comfortable enough to wear to bed and can also play music.

SUMMARY OF THE INVENTION

It is an object of the present invention to provide a noise damping apparatus, combined with a novel combination of existing devices, that insulates the user from all external sounds and noises, but insures that the user will be awakened by either a time alarm or any other alarm of the user's choice.

It is yet another object of the present invention to provide such an apparatus that comprises ear covers that are designed to allow the user to sleep comfortably.

It is yet another object of the present invention to provide such an apparatus wherein the output from a time alarm, security alarm, or other safety source can be heard either through either the ear covers or an external speaker.

It is yet another object of the present invention to provide such an apparatus wherein the user has the ability to listen to music or other soothing sounds from a radio, tape, compact disc or other source.

It is yet another object of the present invention to provide such an apparatus to promote sleep by creating sounds to cover up any noise that is not damped, and also to soothe and relax the user.

It is yet another object of the present invention to provide such an apparatus for awakening the user by transmitting signals to the stereo headphones from either an integral time alarm or an external warning device of the user's choice.

In order to perform these functions and to overcome the above problems, the invention incorporates a pair of hearing protection ear covers that damp external noises. The invention further incorporates a radio/stereo system with which the user can transmit sounds or music to an external speaker and/or to the ear covers. Also connected to the speaker and ear covers is a time alarm which can be transmitted through the speaker and/or the ear covers. The user can adjust the volume of the alarm independent of the music, assuring that the alarm is loud enough to interrupt sleep. The invention also includes input jacks where the signal from a smoke detector or other security device may be transmitted to the speaker and/or ear covers.

In order to promote sleep by blocking and damping noise, the invention utilizes a pair of hearing protection type ear covers combined with stereo headphone speakers. The ear covers serve as a primary insulator from external noises. In one embodiment, the headphone speakers inside the ear covers create a noise reducing frequency which further deadens any noise. The cancellation sound wave may be used either independent from or at the same time as relaxing sounds. The noise cancellation sound wave may also be transmitted through the regular speakers, or through both the headphones and speakers simultaneously. This would serve to dampen noise in the entire room.

In order to promote sleep by creating sound, the invention utilizes a tape and compact disc player, or other means of reproducing pre-recorded sounds. This may be used to play a soothing sound through the stereo headphones, through the speakers, or through both simultaneously. This sound serves two functions. First, the sound soothes and relaxes the user. Second, the sound drowns out and masks any noise not otherwise blocked or damped. There are a number of recorded sounds available for promoting sleep that would serve these purposes. Examples include recordings of ocean waves and other natural sounds, as well as relaxing music.

Sleeping through an alarm clock is a risk for people who sleep wearing ear covers or other hearing protection devices. In order to awaken the user at a pre-selected or otherwise appropriate time, the invention has an integral alarm clock that can be heard through the regular speakers and/or the headphone speakers, depending on the user's selection. The present system insures that the user will be awakened regardless of how much hearing protection or noise damping used. The user can adjust the volume of the alarm independent of the other sound creating devices, insuring the proper volume to interrupt sleep. For example, if the user wore earplugs at the same time as the headphones, he or she can increase the alarm volume to compensate.

The invention also discloses a means for channeling signals from an external alarm or signaling device into the headphones and/or speaker. This prevents the user from sleeping through such an alarm or signaling device. Examples of devices that might be connected include smoke detectors, security alarms, doorbell ringers, intercoms, etc. Each jack or terminal would have an individual volume control so that each connected device can be adjusted to the proper volume to awaken the user, while not being too loud.

DESCRIPTION OF THE PREFERRED EMBODIMENTS

Figure 1:
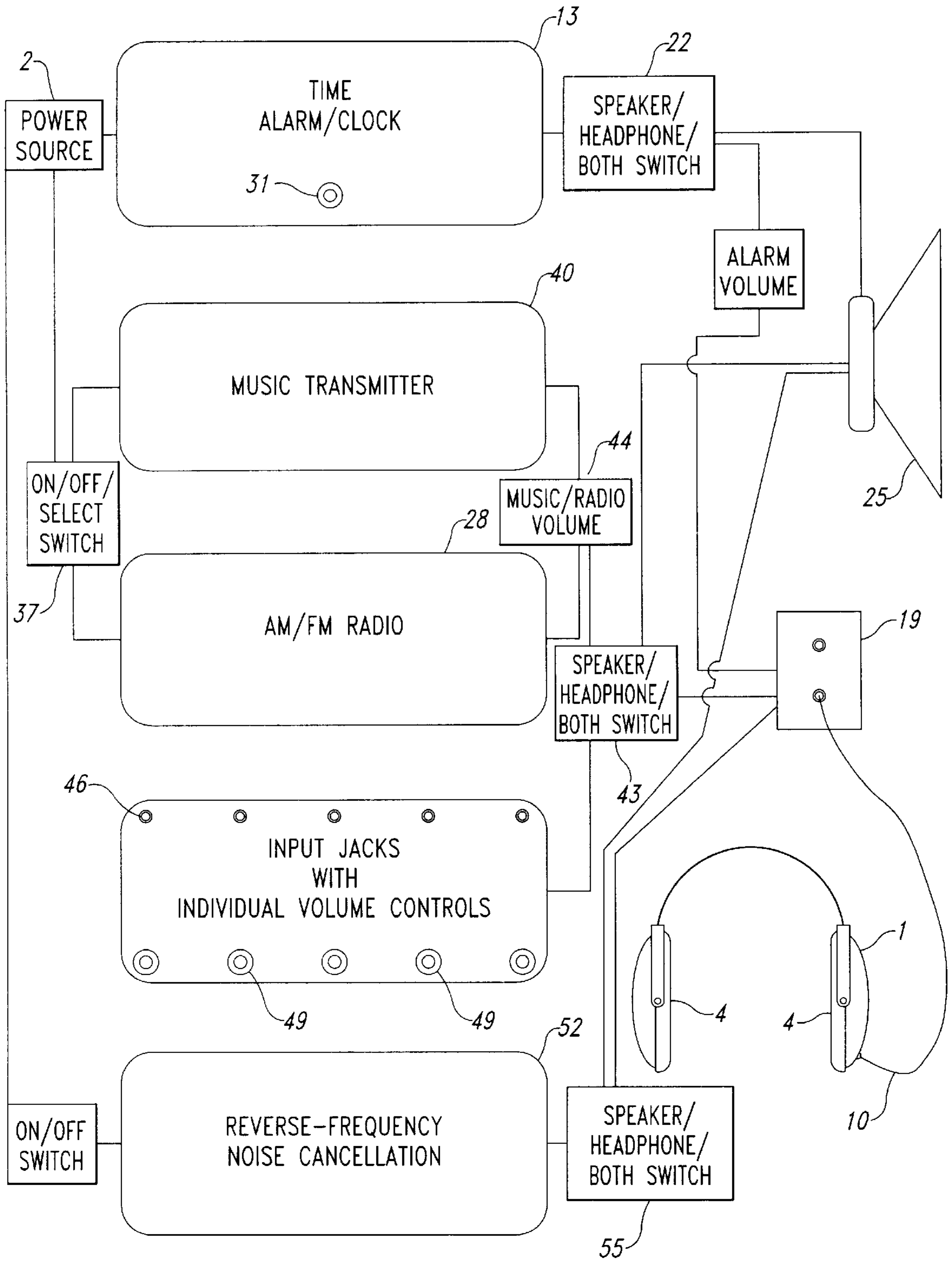
FIG. 1 shows schematic of the system of the present invention.

FIG. 1 shows a schematic diagram of the system disclosed in the present invention. The system comprises hearing protection ear covers 1, a power source 2, a time alarm 13, a radio 28, a music transmission means 40, input jacks 46 for signals generated from other alarms, such as smoke detectors and security alarms, each of said input jacks comprising a second volume control 49, and a means for canceling external noises through reverse frequency superposition 52.

Ear covers 1 insulate both of the user's ears from external sounds. Ear covers 1 are adjustable to the user's head and comprise a layer of soft, compressible padding 4 that surrounds the ear. Padding 4 acts as both a gasket to aid in the insulation of sound, and as padding to make ear covers 1 comfortable enough to wear during sleep. In the preferred embodiment, ear covers 1 are shaped to closely conform to the user's head in order to lessen the effect on the user during sleep, and to minimize discomfort.

Figure 2:
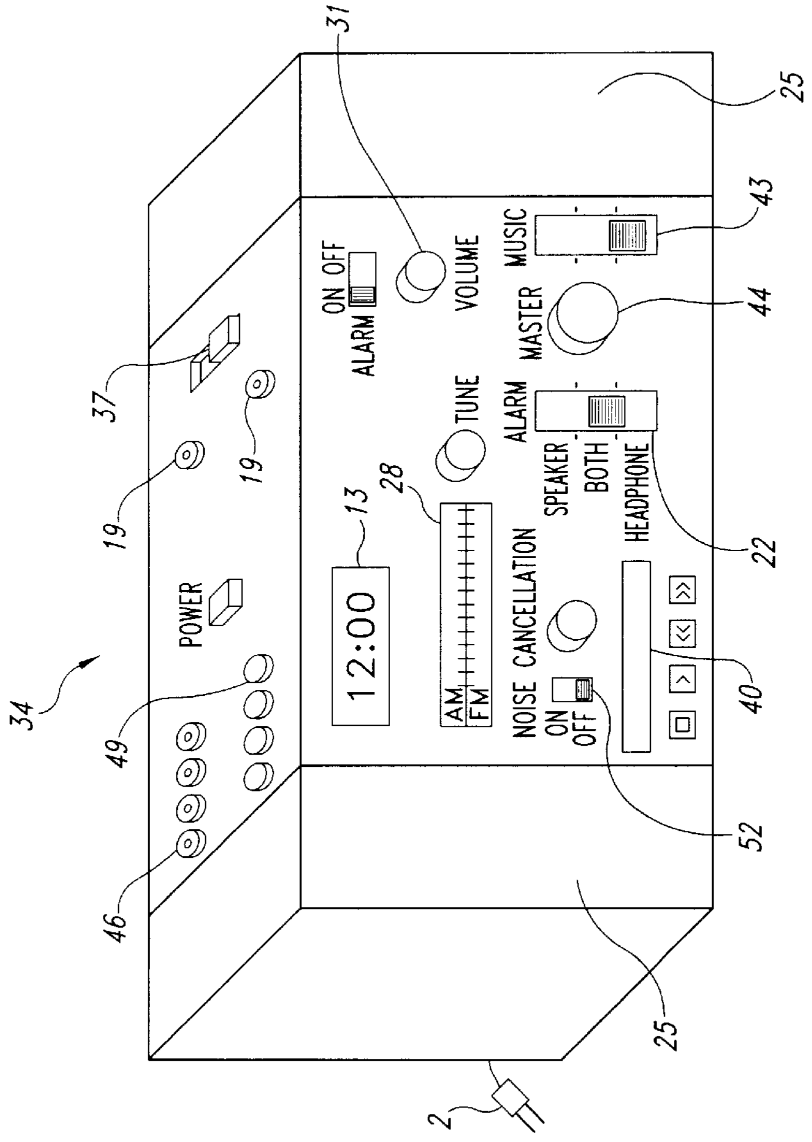
FIG. 2 shows a perspective view of a preferred embodiment of the present invention.

FIG. 2 shows a perspective view of the preferred embodiment of the present invention. Substantially all of the elements of the present invention can be contained in one control unit 34. Control unit 34 is designed to fit on top of a bedside table or shelf. The specific elements contained within control unit 34 as well as the orientation give each element can be adjusted according to the user's desires, needs, and comfort. In the preferred embodiment, control unit 34 comprises time alarm 13, radio 28, music transmission means 40, input jack 46, and the controls for each of these elements. In one variation of the present invention, music transmission means 40 is external to control unit 34, as in the case of a stereo system or television.

Figure 3:
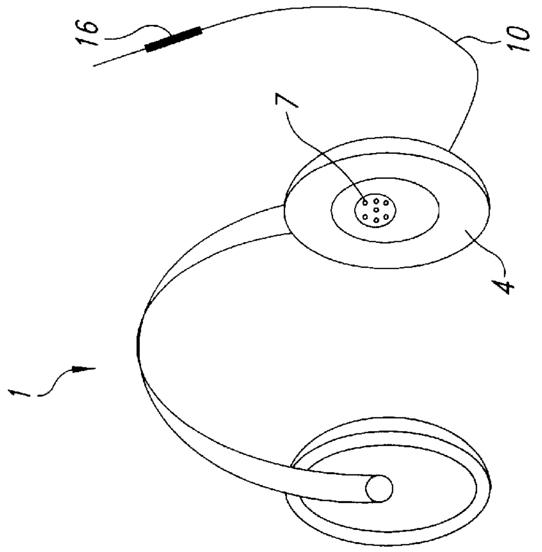
FIG. 3 shows a perspective view of the headset disclosed in the preferred embodiment of the present invention.

FIG. 3 shows a close up perspective view of ear covers 1. To allow the user to hear an alarm signal from time alarm 13 while wearing hearing protection, ear covers 1 comprise stereo headphones 7, one speaker on each side. Headphones 7 are mounted on the inside surface of ear covers 1 so as not to contact the user's ear. Headphones 7 are connected to a pair of wire leads 10 that, together, extend from one side of ear cover 1 and terminate in a plug 16. Wire leads 10 may vary from two to eight feet, or more, to accommodate the user's needs. The inventor recognizes that wireless technology can be used to replace wire leads 10, and such technology is well known in the art. Plug 16 has a size and shape complementary to output jack 19 in control unit 34. Plug 16 may also be designed to have the size and shape necessary to fit into either the headphone port of a home stereo, portable radio, or cassette player. Additional output jacks 19 may be incorporated in control unit 34 to allow the system to be used by more than one person at a time.

The sound generated by time alarm 13 is transmitted via a wire, or any other transmission mode known in the art, from time alarm 13 to first output switch 22. First output switch 22 is positioned between time alarm 13 both output jack 19 and speaker 25. By changing the position of first output switch 22, the user has may transmit the time alarm to headphones 7 via output jack 19, to speaker 25, or to both. Transmitting the signal to speaker 25 allows the alarm to be heard by any person in the area.

Between first output switch 22 and output jack 19 is positioned first volume control 31. First volume control 31 controls the volume of the signal transmitted from time alarm 13 to headphones 7. This feature allows the amplitude of the alarm to be independently adjusted to satisfy the particular user's needs, or to compensate for other sounds or music being transmitted through headphones 7.

If the user desires additional audible stimuli to facilitate sleep, the present invention comprises radio 28 and a music transmission means 40 for transmitting the user's choice of music. The user selects which source of sound with selector switch 37. Music transmission means 40 can be a turntable, cassette player, or compact disc player, and, in the preferred embodiment, contains a repeat function whereby the user can hear the sounds or music played constantly throughout the sleeping period. Music transmission means 40 can be an integral part of the apparatus, a unitary device, such as a portable stereo, or can be a sectional, stereo system. Similar to time alarm 13, music transmission means comprises a second output switch 43 that allows the user to play music through headphones 7, speaker 25, or both. Control unit 34 comprises a master volume control 44 for controlling the amplitude from either radio 28 or music transmission means 40. In addition, any external device making up the music transmission means 40 has its own volume control.

In order to transmit signals from other alarm devices, such as a smoke, fire, or security alarm, or to transmit signals from devices such as infant "walkie-talkies," the invention comprises input jacks 46. Each input jack 46 is controlled by a corresponding second volume control 49. Any device that transmits a signal to a speaker can be retrofit with a standard plug that will fit into input jack 46. In that state, the signal that would have been transmitted to the device's speaker will be broadcast instead to speaker 25 and/or headphones 7. Similar to radio 28 and music transmission means 40, the output means to which these external devices is directed is controlled by second output switch 43.

An additional feature disclosed in the present invention is a means for canceling noise 52. Noise canceling means 52 transmits select frequencies to speaker 25 and/or headphones 7 such that, when superimposed over ambient noises, the superposition of the frequencies reduces the sound detected by the human ear. The specific design of noise canceling means 52 is not claimed in the present invention, and such technology is known to those skilled in the art. Third output switch 55 allows the user to transmit the noise canceling signal to headphones 7, speaker 25, or both.

Time alarm 13, music transmission means 40, and noise canceling means 52 can have independent power supplies, or can share a common power supply. If the apparatus is embodied in the form of a portable stereo, a common power supply, either DC or AC, would be utilized. If, however, a component stereo is utilized, independent AC power supplies would be utilized.

Although a limited number of embodiments of the invention have been illustrated and described, various alternatives, modifications and equivalents may be used. Therefore, the foregoing description should not be taken as limiting the scope of the inventions which are defined by the appended claims.

What is claimed is:

1. An apparatus for promoting sleep and preventing oversleeping comprising:

a control unit comprising a time alarm; a radio; a music transmission means; at least one input jack; at least one speaker; at least one output jack; a selector switch whereby the user can select between said radio and said music transmission means; and a master volume control whereby the volume of either said radio or said music transmission means, as determined by said selector switch, may be adjusted; said time alarm, radio, music transmission means, and input jack are connected via parallel circuitry to said speaker and said output jack whereby said time alarm or an external alarm utilizing said input jack can be heard by the user even when music is playing; said time alarm comprising a first output switch whereby the output of said time alarm can be directed to said speaker, said output jack, or both; said time alarm further comprising a first volume control whereby the user can independently adjust the volume of said time alarm so as to be heard over any music playing; said input jack comprising a second volume control whereby the user can adjust the volume of any device being transmitted through said input jack;

a second output switch whereby the user can direct the output from either said radio or said music transmission means to said speaker, said output jack, or both;

a noise canceling means comprising a third output switch whereby the user can direct the output of said noise canceling means to said speaker, said output jack, or both; and at least one ear cover comprising a headphone and a wire lead; said headphone rigidly attached to the inside of said ear cover; said wire lead originating at said headphone and terminating in a plug complementary to said output jack whereby said headphone can be removably connected to said control unit by inserting said plug into said output jack.

2. An apparatus for promoting sleep and preventing oversleeping comprising:

a control unit comprising a time alarm; a radio; at least one output jack; and a master volume control whereby the volume of said radio may be adjusted; said time alarm and said radio connected via parallel circuitry to said output jack whereby said time alarm can be heard by the user when music is playing; said time alarm further comprising a first volume control whereby the user can independently adjust the volume of said time alarm so as to be heard over any music playing;

at least one ear cover comprising a headphone, said headphone rigidly attached to the inside of said ear cover and communicating with said control center whereby output from said control center is heard by the user.

3. An apparatus according to claim 2 wherein the communication between said control unit and said headphone is accomplished by a wire lead, said wire lead originating at said headphone and terminating in a plug complementary to said output jack whereby said headphone can be removably connected to said control unit by inserting said plug into said output jack.

4. An apparatus according to claim 3 further comprising:

a music transmission means connected parallel to said time alarm and said radio whereby an alarm from said time alarm can be heard over music being played by said music transmission means;

a selector switch whereby the user can select either said radio or said music transmission means; and wherein said master volume control controls either said radio or said music transmission means, as determined by said selector switch.

5. An apparatus according to claim 3 further comprising at least one input jack connected via parallel circuitry with said radio and said time alarm whereby a signal from an external source connected to said input jack can be heard over music being played; said input jack comprising a second volume control whereby the user can adjust the volume of any device being transmitted through said input jack.

6. An apparatus according to claim 3 further comprising a noise canceling means whereby a frequency opposite that of ambient noises is transmitted to said headphones.

7. An apparatus according to claim 3 further comprising at least one speaker, a first output switch whereby the output of said time alarm can be directed to said speaker, said output jack, or both, and a second output switch whereby the output of said radio can be directed to said speaker, said output jack, or both.

8. An apparatus according to claim 7 further comprising a noise canceling means comprising a third output switch whereby the user can direct the output of said noise canceling means to said speaker, said output jack, or both.

9. An apparatus according to claim 7 further comprising:

a music transmission means wired parallel to said time alarm and said radio whereby an alarm from said time alarm can be heard over music being played by said music transmission means;

a selector switch whereby the user can select either said radio or said music transmission means;

said second output switch also controls said music transmission means whereby the user can direct the output from either said radio or said music transmission means to said speaker, said output jack, or both; and said master volume control controls either said radio or said music transmission means, as determined by said selector switch.

10. An apparatus according to claim 7 further comprising at least one input jack connected via parallel circuitry with said radio and said time alarm whereby a signal from an external source connected to said input jack can be heard over music being played; said input jack comprising a second volume control whereby the user can adjust the volume of any device being transmitted through said input jack.

* * * * *